(12) United States Patent
Choi et al.

(10) Patent No.: US 7,474,220 B2
(45) Date of Patent: Jan. 6, 2009

(54) THREE-DIMENSIONAL RADIO FREQUENCY IDENTIFICATION TAG AND ENVIRONMENT CONDITION RECOGNITION SYSTEM AND METHOD USING TAG

(75) Inventors: Hyouk-Ryeol Choi, Gunpo-si (KR); Se-Gon Roh, Suwon-si (KR); Jin-Ho Park, Pohang-si (KR)

(73) Assignee: Sungkyunkwan University Foundation for Corporate Collaboration, Suwon-si (KR)

( * ) Notice: Subject to any disclaimer, the term of this patent is extended or adjusted under 35 U.S.C. 154(b) by 258 days.

(21) Appl. No.: 11/379,317

(22) Filed: Apr. 19, 2006

(65) Prior Publication Data
US 2006/0273905 A1    Dec. 7, 2006

(30) Foreign Application Priority Data
Jun. 4, 2005   (KR) .................... 10-2005-0048129
Jun. 15, 2005  (KR) .................... 10-2005-0051234

(51) Int. Cl.
*G08B 13/14*    (2006.01)

(52) U.S. Cl. .............. 340/572.7; 340/572.8; 340/572.1; 340/572.4; 340/568.1; 340/539.1; 235/383; 235/492

(58) Field of Classification Search .............. 340/572.8, 340/572.7, 572.1, 572.3, 572.4, 539.1, 568.1, 340/10.1, 10.3; 235/375, 383, 385, 492, 235/376; 343/893
See application file for complete search history.

(56) References Cited

U.S. PATENT DOCUMENTS

| | | | |
|---|---|---|---|
| 7,019,650 B2* | 3/2006 | Volpi et al. ................ | 340/572.1 |
| 7,142,124 B2* | 11/2006 | Chi et al. .................... | 340/612 |
| 2005/0212660 A1* | 9/2005 | Hansen et al. ............. | 340/10.3 |
| 2005/0242959 A1* | 11/2005 | Watanabe ................ | 340/572.7 |

* cited by examiner

*Primary Examiner*—Hung T. Nguyen
(74) *Attorney, Agent, or Firm*—Sughrue Mion, PLLC

(57) ABSTRACT

A three-dimensional (3D) radio frequency identification (RFID) tag and an environment condition recognition system and method using the 3D RFID tag are provided. The environment condition recognition system capable of recognizing position and orientation of the object includes a plurality of RF tags each having a self identifier ID, being independently disposed, and having an orientation with respect to a main axial direction, an RFID antenna activating the tags and initiating connection with the RF tags, a reader connected to the antenna and reading information of the RF tags, and an analysis unit connected to the reader and collecting and analyzing the information of the tags.

13 Claims, 10 Drawing Sheets

(a) 2 tags        (b) 3 tags        (c) 4 tags

1. Start

5. Move

2. Search

6. Search

3. Detect

7. Detect

4. Check

8. Check

THREE-DIMENSIONAL RADIO FREQUENCY IDENTIFICATION TAG AND ENVIRONMENT CONDITION RECOGNITION SYSTEM AND METHOD USING TAG

This is an application under 35 U.S.C. § 1.111(a) which claims priority from Korean Patent Application 10-2005-0048129 filed Jun. 4, 2005, and Korean Patent Application 10-2005-0051234 filed on Jun. 15, 2005, all of which are incorporated herein by reference.

BACKGROUND OF THE INVENTION

1. Field of the Invention

The present invention relates to a three-dimensional (3D) radio frequency identification (RFID) tag capable of automatically recognizing orientation, and an environment condition recognition system and method using the 3D RFID tag. More particularly, the present invention relates to a 3D RFID tag, and an environment condition recognition system and method using the 3D RFID tag, capable of recognizing the orientation of a mounted object as well as its own characteristics and the position, and thus presenting a new paradigm in the field of autonomous object sensing, identification, and recognition technology.

2. Description of the Related Art

A typical RFID system is basically composed of a tag (or a card), a reader, and a host computer (or an application). The tag is composed of a radio frequency RF function, a memory, and an antenna (or a power supply), and carries out interfacing using ID information in the memory. Various applications of the RFID system have been developed and put to use according to objects to which ID information in the tag memory and an RF interface are applied, methods of utilizing the same, and a given environment.

RFID is one type of autonomous identification technology using RF communication and performs a function similar to a bar code and a smart card. However, RFID lacks the limits of the bar code which is limited by environmental factors (e.g., rain, snow, fog, contamination, etc.) and the smart card which can only be recognized within an extremely limited range (e.g., several millimeters to tens of millimeters). RFID enables identification even in poor environmental conditions and even when an object is moving at a fast speed ranging from several m/s to tens of m/s. Thus, RFID is widely utilized in industry, for example, in book management systems, livestock management, financial systems, door-to-door delivery systems, electronic toll collection system ETCSs, parking systems, access control systems, physical distribution systems, and so forth.

An RFID tag is composed of an IC chip, an antenna, and an adhesive material, and exchanges predetermined data with an external reader or an interrogator. Thus, the RFID tag is a type of a transponder.

The RFID tag contactlessly transponds data with the reader. It may use inductive coupling, backscattering, surface acoustic wave SAW, etc. in response to high and low frequencies, and may exchange data with the reader in a full duplex FDX, a half duplex HDX, and a sequential SEQ manner using electromagnetic waves. In addition, the transponding method may include amplitude shift keying ASK and frequency shift keying FSK of electromagnetic waves. In addition, the general RFID tag may be classified into two kinds: a disk-shaped antenna coil using a circular air-core coil, and a cylindrical antenna coil consisting of an insulated coating copper wire such as an enamel wire wound around a bar-shaped ferrate core. Outer shapes of the tags correspond to the shapes of the respective antenna coils. Thus, the former type of tag is disc-shaped and the latter type of tag is bar-shaped.

The RFID tag with the disc-shaped antenna coil transponds according to change in magnetic flux in the plane direction of the circular coil, and the RFID tag with the cylindrical antenna coil transponds according to change in magnetic flux in the axial direction.

Conventionally, a low frequency band including 125 kHz, 13.56 MHz, etc. is widely utilized as a frequency band of the RFID tag. However, an ultra high frequency UHF band of 900 MHz has been used recently for managing physical distribution. In particular, the RFID tag is used for managing physical distribution in a large-sized distributor such as Walmart or the U.S. Department of Defense. In such cases, the UHF band and backscattering are usually utilized, and a passive type RF tag, which operates manually in response to external change without a separate built-in battery to generate a necessary current, is recognized as a standard.

Conventional identification methods using RFID include a method of using a tag itself, a method of integrating a tag into a laminated card, a method of using an adhesive medium such as a sticker, and a method of molding a tag by means of injection molding, and so forth.

However, the tag to which the RFID techniques are applied has weak adhesion to an object for obtaining information, cannot be easily attached to and engaged with a product, cannot be recycled, and its RFID circuit is vulnerable to damage caused by external impact.

The RFID tag is composed of an IC chip, an antenna, and an adhesive material. The IC chip is usually based on a film substrate formed of various plastic materials such as polyvinyl chloride PVC, polychlorinated Biphenyl PCB, polyethylene PE, polyamide PA, and polyethylene terephthlate PET, having a thickness of about 100 µm or less, and having an antenna on its upper portion. A conductive wire of the antenna may be mounted on the chip substrate, directly bonded with the IC chip outside the film, or connected in a chip-on-board COB manner The size of the antenna may increase as a reading range required by the reader increases, may decrease as a radiation power of the reader increases, and may decrease as frequency increases. In this case, when data is exchanged through backscattering using frequency in a band not lower than the UHF band, the degree of backscattering depends on the size and shape of the antenna, geometric conditions, topography, wavelength, and polarization, and efficiency is better for an antenna made of metal.

In summary, in the case of the widely used tag in the frequency band not greater than 13.56 MHz, there are basic limits such as the antenna having to be formed as a coil using inductive coupling, the size of the antenna having to be at least several meters, and the outer housing having to be devoid of metal.

However, the RFID technique using a frequency of at least about 900 MHz, and backscattering, become universal in a field such as physical distribution, so that restrictions on the size of the antenna and the material of the housing are significantly relaxed.

However, electromagnetic waves consist of alternating electric and magnetic fields that are 90 degrees out of phase, and when the alternating magnetic field is applied to a conductive member such as iron, aluminum, or copper, current is induced in a direction so as to generate a magnetic field counter to the alternating magnetic field.

Accordingly, the RFID tag is generally installed as far away from the conductive member as possible.

Therefore, when the RFID tag must be installed close to the conductive member, the RFID tag with the disc-shaped antenna coil is used, a coil side of the RFID tag and a surface of the conductive member are disposed in parallel with each other, and an insulating spacer is interposed therebetween to prevent current induction. Alternatively, a ferrate core or an amorphous magnetic sheet having a high magnetic permeability may be interposed between the coil side and the surface of the conductive member to shield the conductive member and prevent current induction.

Accordingly, effects of the conductive member can be reduced, and communication can be carried out by any of the methods in a direction perpendicular to the coil side, that is, a direction where a magnetic flux distribution is widened by the disc-shaped antenna coil.

The RFID tag with the cylindrical antenna coil can be made significantly smaller than the RFID tag with the disc-shaped antenna coil, and thus has superior adaptability for all uses.

As described above, the magnetic field runs in the axial direction of the antenna coil due to the RFID tag with the cylindrical antenna coil. In communicating with a read/write terminal, better sensitivity can be obtained from a direction of a leading end portion of a core member inserted into the antenna coil.

When this RFID tag is installed on the surface of the conductive member, out of common sense, its axial direction is made to be perpendicular to the surface of the conductive member to facilitate communication. However, it is actually more practical to form an installation groove perpendicular to the surface of the conductive member and install the tag therein.

Further, even when the RFID tag is installed within the installation groove, matching the length of the tag, to communicate with the read/write terminal, communication may be hindered by the surrounding conductive member. Accordingly, in conventional installation with a conductive member, the RFID tag having the disc-shaped antenna coil is used.

However, in the above-described conventional system, information obtained by the RFID only identifies the object and does not reflect its variable physical characteristics (e.g., position, orientation).

That is, the conventional art provides only a unit having a tag mounted at a specific position, or having a function capable of recognizing the position, and a system utilizing this tag to recognize the absolute position of a main body where the moving unit is mounted, and determine position, movement state, and speed of a device. However, the conventional art does not address recognition of the orientation of the object as well as its own characteristics and position.

SUMMARY OF THE INVENTION

The present invention provides a 3D RFID tag capable of easily obtaining information about an object, a human, and an environment, and obtaining physical characteristics (e.g., position, orientation) of the targeted object, as well as information required for identification, to implement integrated autonomous identification, and an environment condition recognition system and method using the 3D RFID tag.

The present invention also provides an environment condition recognition system and method using a 3D RFID tag that is resistant to contamination and damage and capable of operating in a semi-permanent way to implement an autonomous identification technique.

The present invention also provides a 3D RFID tag capable of selectively obtaining information about physical characteristics of a targeted object (e.g., position, orientation) as well as information required for identification, and an environment condition recognition system and method using the 3D RFID tag.

According to an aspect of the present invention, there is provided a 3D RFID tag, comprising: a plurality of RF tags independently disposed along main axial directions representing an object, the RF tags having self identifiers (IDs); and a supporter supporting the plurality of RF tags and having an electromagnetic field shielding characteristic to prevent mutual overlap of electromagnetic fields radiated from the plurality of RF tags.

According to another aspect of the present invention, there is provided a 3D RFID tag, comprising: a polyhedral supporter having an electromagnetic field shielding characteristic; and a plurality of RF tags having IDs and attached to respective sides of the supporter, wherein the electromagnetic field shielding characteristic of the supporter prevents mutual overlap of electromagnetic fields radiated from the plurality of RF tags.

According to still another aspect of the present invention, there is provided a 3D RFID tag, comprising: a plurality of RF tags independently disposed along main axial directions representing an object, each of the RF tags having an ID and radiating a uni-directional electromagnetic field in a single direction; and a supporter supporting the plurality of RF tags.

According to yet another aspect of the present invention, there is provided a 3D RFID tag, comprising: a polyhedral supporter; and a plurality of RF tags independently attached to respective sides of the supporter, each of the RF tags having an ID and radiating a unidirectional electromagnetic field in a single direction.

According to yet another aspect of the present invention, there is provided a 3D RFID tag capable of recognizing a position and an orientation of an object, the 3D RFID tag comprising: a plurality of RF tags, each having an orientation; and a supporter supporting the tags, wherein the 3D RFID tag is attached to the object and the object has an electromagnetic field shielding function.

According to yet another aspect of the present invention, there is provided a 3D RFID tag capable of recognizing a position and an orientation of an object, the 3D RFID tag comprising: a plurality of RF tags, each having an orientation; and a supporter supporting the tags and having an electromagnetic field shielding function, wherein the 3D RFID tag is attached to the object and the object does not have an electromagnetic field shielding function.

According to yet another aspect of the present invention, there is provided an environment condition recognition system capable of recognizing a position and an orientation of an object, the 3D RFID tag comprising: a 3D RFID tag including a plurality of RF tags independently disposed along main axial directions representing an object, each of the RF tags having an ID, and a supporter supporting the tags, the 3D RFID tag being attached to an object having an electromagnetic field shielding function; an RFID antenna activating the 3D RFID tag and initiating connection with the RF tags; a reader connected to the antenna and reading information of the RF tags; and an analysis unit connected to the reader and collecting and analyzing the information of the RF tags.

According to yet another aspect of the present invention, there is provided an environment condition recognition system capable of recognizing a position and an orientation of an object, the 3D RFID tag comprising: a 3D RFID tag including a plurality of RF tags independently disposed along main axial directions representing an object, each of the RF tags having an ID, and a supporter supporting the tags and having an electromagnetic field shielding function, the 3D RFID tag being attached to an object not having an electromagnetic field shielding function; an RFID antenna activating the 3D RFID tag and initiating connection with the tag; a reader connected to the antenna and reading information of the RF tags; and an analysis unit connected to the reader and collecting and analyzing the information of the RF tags.

According to yet another aspect of the present invention, there is provided an environment condition recognition system capable of recognizing a position and an orientation of an object, the 3D RFID tag comprising: a plurality of RF tags having IDs, being independently disposed, and having orientation with respect to main axial directions; an RFID antenna activating the 3D RFID tag and initiating connection with the tag; a reader connected to the antenna and reading information of the tag; and an analysis unit connected to the reader and collecting and analyzing the information of the RF tags, wherein the plurality of RF tags correspond to the position and the orientation of the object, and are attached to the object so as to match the respective axial directions in an orthogonal coordinate system of the object.

According to yet another aspect of the present invention, there is provided a method of recognizing an environment condition capable of recognizing a position and an orientation of an object, the 3D RFID tag comprising: attaching a plurality of RF tags to the object, each of the tags having an ID, being independently disposed, and having orientation with respect to a main axial direction; detecting the tags attached to the object by means of a RFID antenna activating the tags and initiating connection with the RF tags, and a reader connected to the antenna and reading information of the RF tags; and collecting and analyzing the information of the tags by means of an analysis unit connected to the reader, wherein the plurality of RF tags correspond to the position and the orientation of the object, and are attached to the object so as to match the respective axial directions in an orthogonal coordinate system of the object.

BRIEF DESCRIPTION OF THE DRAWINGS

The above and other objects, features and advantages of the present invention will become more apparent from the following detailed description taken in conjunction with the accompanying drawings, in which.

DETAILED DESCRIPTION OF THE INVENTION

The 3D RFID tag according to the present invention will now be described.

Figure 1:
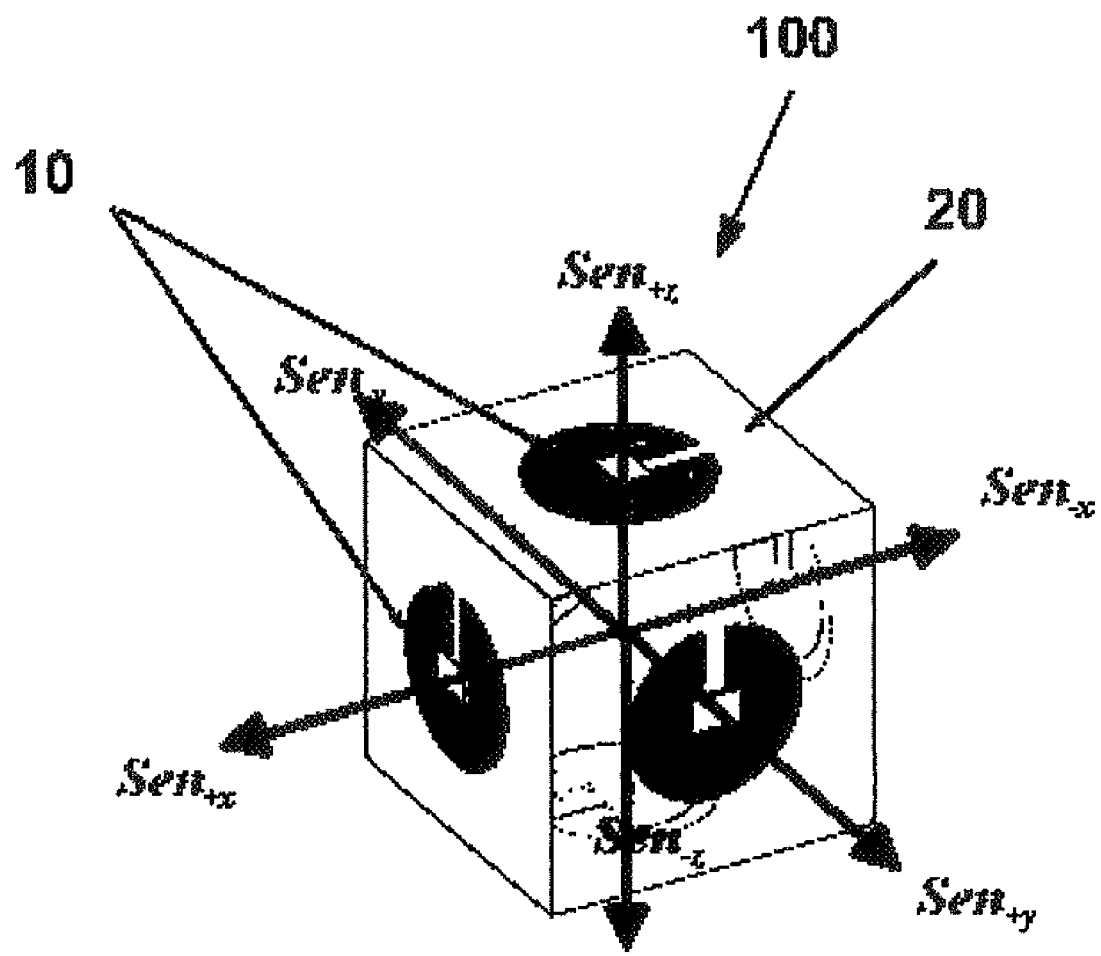
FIG. 1 is a perspective diagram of a 3D RFID tag in accordance with the present invention.

FIG. 1 is a perspective view of a 3D RFID tag in accordance with an exemplary embodiment of the present invention.

As shown in FIG. 1, the 3D RFID tag according to an exemplary embodiment of the present invention is composed of a polyhedron supporter 20, and a plurality of RF tags 10 (e.g., six tags 10) attached to respective sides of the supporter 20.

In addition, a memory element, an electronic controlled element, and a condenser may be disposed within the supporter 20, and the respective tags 10 may act as antennas having orientation and directivity characteristics. Alternatively, the tag may be configured such that a memory element, an electronic controlled element, and a condenser is provided at each of the RF tags 10.

Each of the RF tags 10 applicable to the present invention is an RFID tag. International standardization of RFID technology is rapidly progressing with frequency ranges set to, for example, 125 KHz to 135 KHz, 13.56 MHz, 862 KHz to 928 KHz, 2450 MHz. Also, RFID technology is classified into an active type and a passive type in response to whether the tag includes a battery.

The active type RF tag using a battery advantageously has a longer range than the passive type RF tag. However, it is larger and more expensive than the passive type RF tag, and its lifespan is limited. The passive type RF tag is supplied with power from a reader without using a battery, is smaller and less expensive than the active type tag, and can be used in a semi-permanent way. However, it has a shorter range.

In addition, the above-described RFID tag can be classified into a 3D RFID tag and an omni-directional 3D tag depending on whether the electromagnetic waves it radiates have directivity.

Alternatively, the supporter 20 may have a different configuration depending on whether the tag 10 has directivity or omnidirectivity.

When the omni-directional 3D tag is used in the present invention, at least the surface of the supporter 20 must be formed of a metal having superior conductivity. That is, in order to prevent mutual interference from occurring due to the electromagnetic field radiated from the tags attached to the respective sides of the supporter 20, at least the surface of the supporter 20 must be applied with a metal having superior conductivity.

In contrast, when the uni-directional tag is used in the present invention, the surface of the supporter 20 need not be formed of metal having superior conductivity. Mutual interference does not occur when the electromagnetic field radiated from each tag attached to a side of the supporter 20 is orthogonal to the side.

Accordingly, the 3D RFID tag of the present invention only needs to be configured such that the RF tags are respectively disposed along the main axial directions of the object, with self identifiers ID, and the supporter acts to support the respective tags and has the electromagnetic field shielding characteristic so that electromagnetic fields radiated from the respective tags do not mutually interfere.

In addition, the 3D RFID tag of the present invention only needs to be configured such that the supporter has the electromagnetic field shielding characteristic and a polyhedron shape, the RF tags are independently attached to the respective sides of the supporter with self identifiers ID, and the electromagnetic fields radiated from the plurality of RF tags do not overlap each other by means of the electromagnetic field shielding characteristic of the supporter.

In addition, the 3D RFID tag of the present invention only needs to be configured such that the RF tags are independently disposed along the respective main axial directions representing the object, have self identifiers ID, and radiate uni-directional electromagnetic fields orthogonal to the respective sides, and the supporter 20 supports the tags 10. In addition, the 3D RFID tag of the present invention only needs to be configured such that the supporter is a polyhedron, and the RF tags are independently attached to the respective sides of the supporter 20, have identifiers ID, and radiate unidirectional electromagnetic fields orthogonal to the respective sides.

The above-described tag may be an active type RF tag or a passive type RF tag, and all tags used for a 3D RFID tag preferably have the same shape, the same electromagnetic characteristic, and the same frequency band characteristic.

Figure 2:
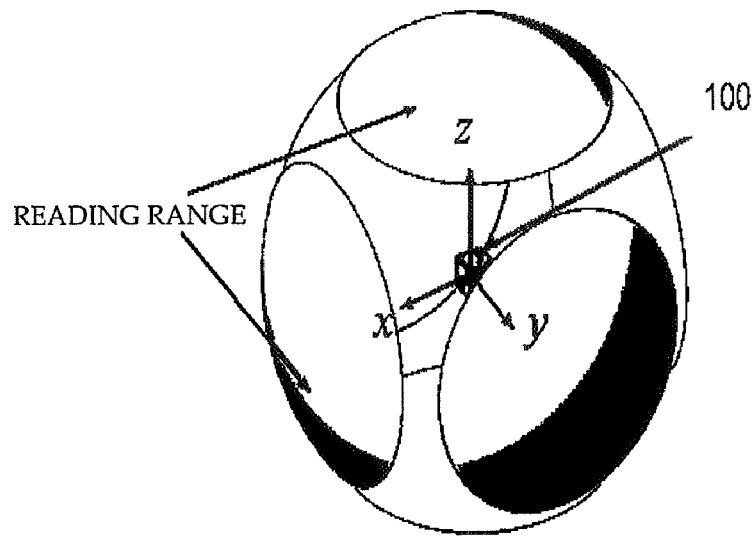
FIG. 2 illustrates an example of the shape of an electromagnetic field radiated from the 3D RFID tag in accordance with the present invention.

The above-described 3D RFID tag has the characteristic the respective axial directions being recognized by the self IDs, and the electromagnetic fields radiated from the polyhedron of the tag being mutually independent, as shown in FIG. 2 Accordingly, when electromagnetic waves radiated from a reader along at least one among x, y, and z axes is sensed, information required for recognizing an object, a human, or the environment on which the corresponding 3D RFID tag is mounted can be more easily obtained, and when the targeted object slightly moves to the left, right, up, or down, electromagnetic waves radiated along the x, y, and z axes can be sensed, so that changes in position and posture/orientation of the object, human, or environment on which the corresponding 3D RFID tag is mounted can be easily obtained. Accordingly, integrated autonomous recognition of object, human, or environment on which the corresponding 3D RFID tag is mounted can be implemented.

Next, other exemplary embodiments of the present invention will be described with reference to FIGS. 3 to 10.

Figure 3:
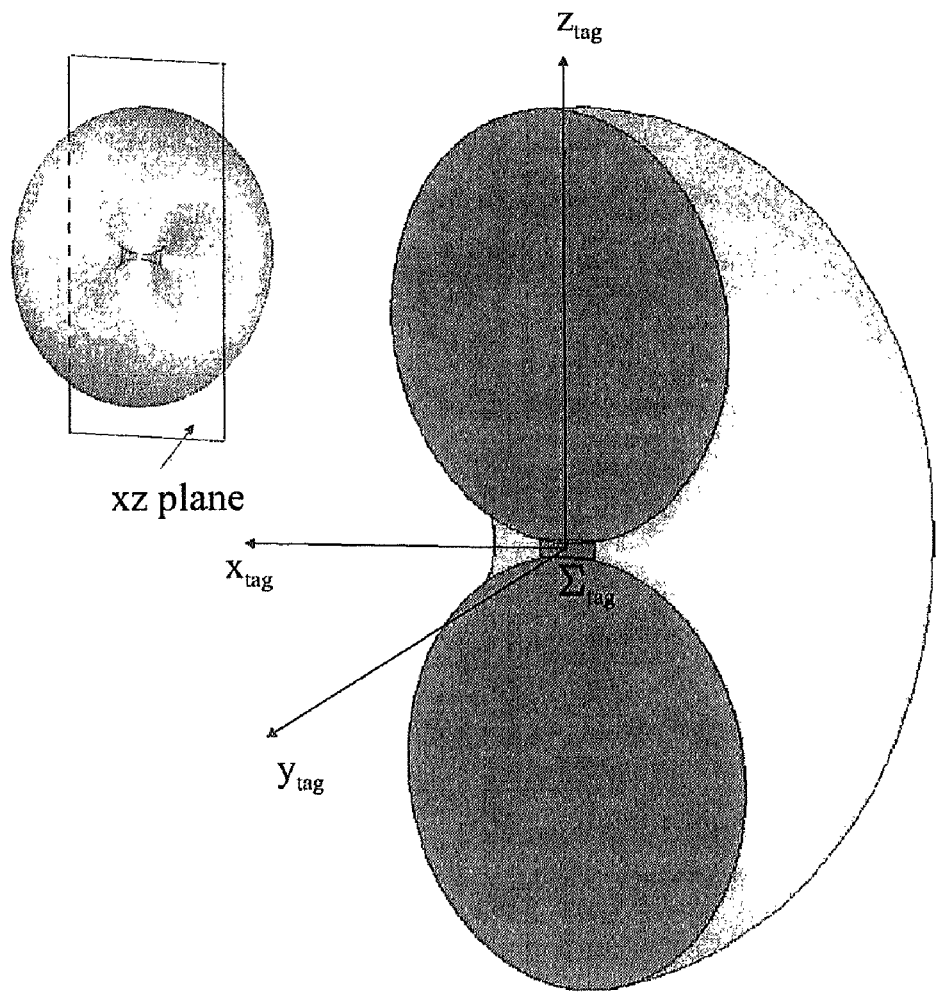
FIG. 3 illustrates a radiation characteristic of the tag in accordance with the present invention.
Figure 4:
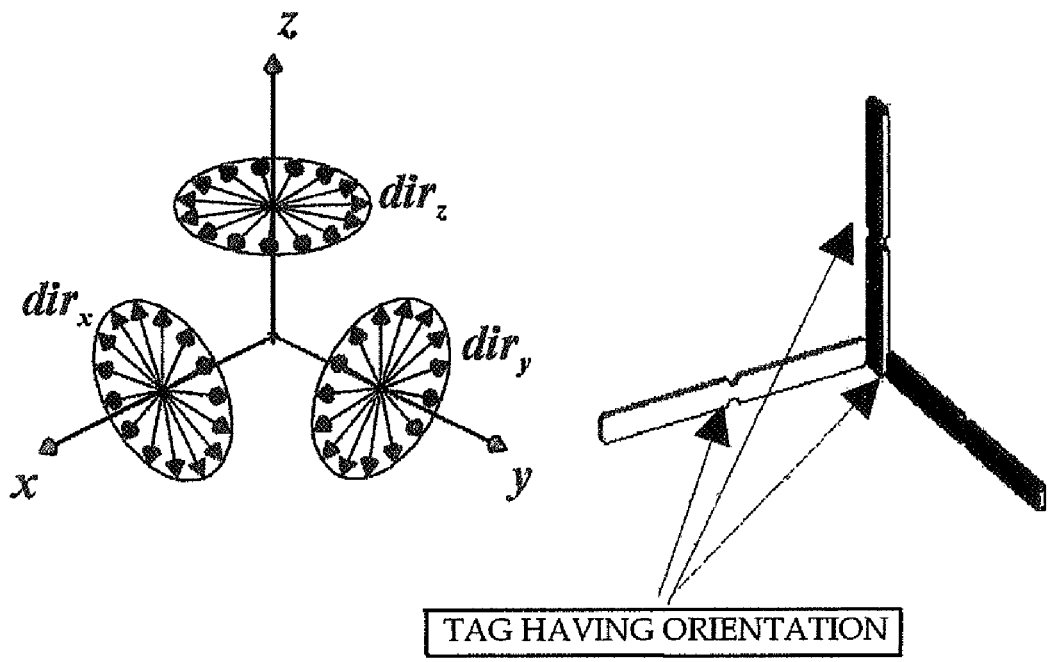
FIG. 4 illustrates directions ($dir_x$, $dir_y$, $dir_z$) that can be recognized when tag coordinates x of FIG. 3 are disposed in parallel with a coordinate axis of an object.
Figure 5:
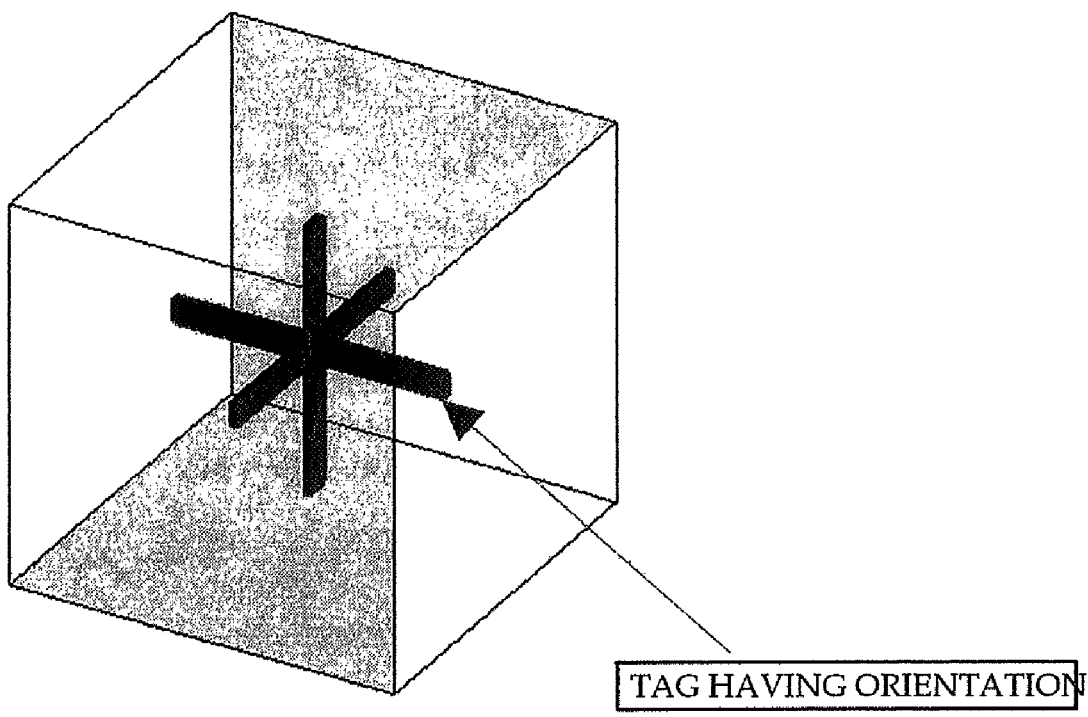
FIG. 5 illustrates a 3D RFID tag composed of three mutually orthogonal tags and a supporter.
Figure 6:
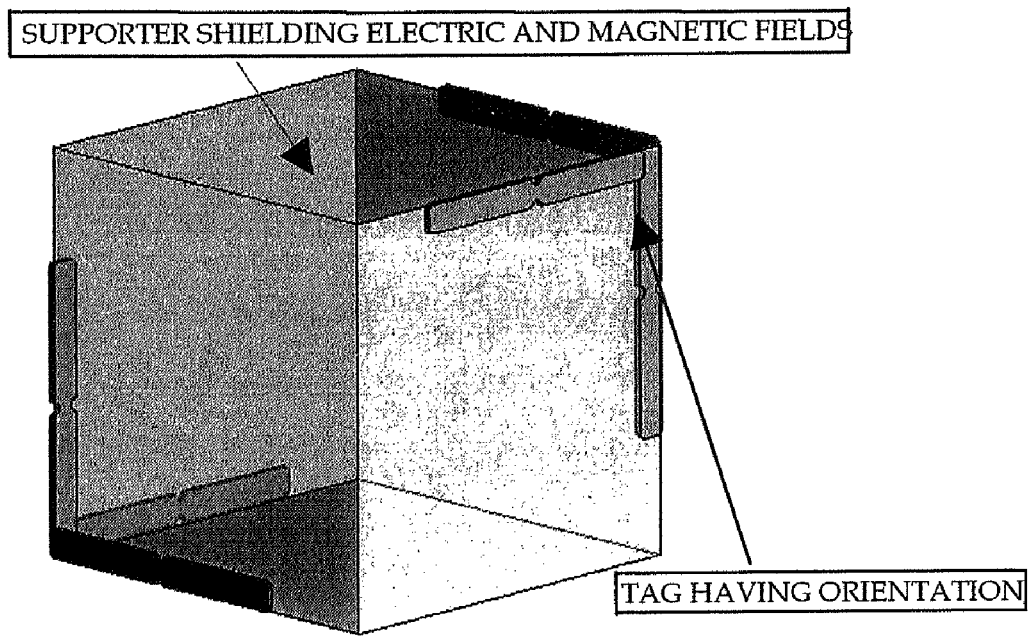
FIG. 6 illustrates a 3D RFID tag composed of three mutually orthogonal tags attached to the outside of an electric field shielding supporter for shielding off an electromagnetic field.
Figure 7:
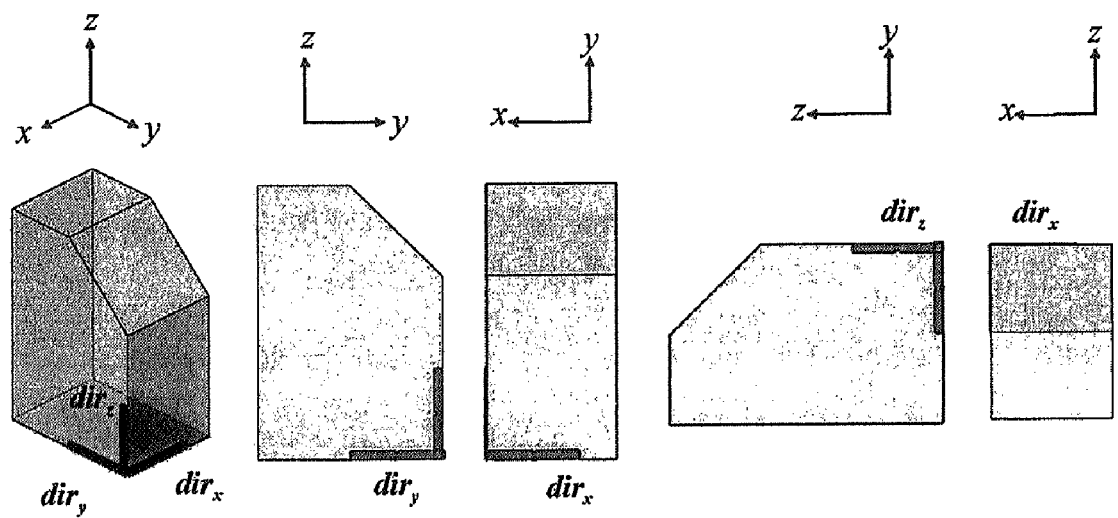
FIGS. 7 to 10 illustrate general bar-shaped tags having orientations attached to objects to represent coordinates of the objects, according to shapes of the objects, without using a 3D RFID tag.
Figure 8:
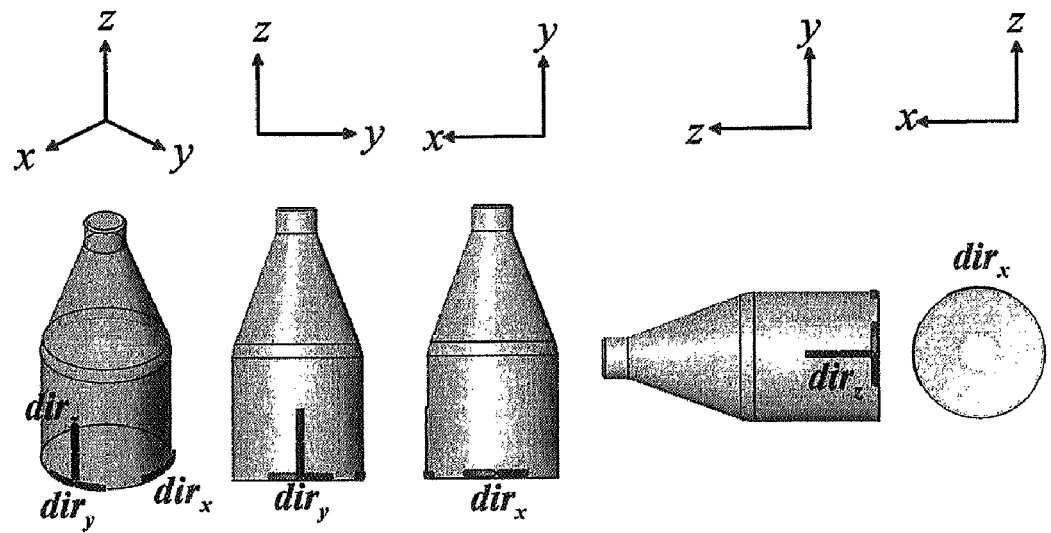
Figure 9:
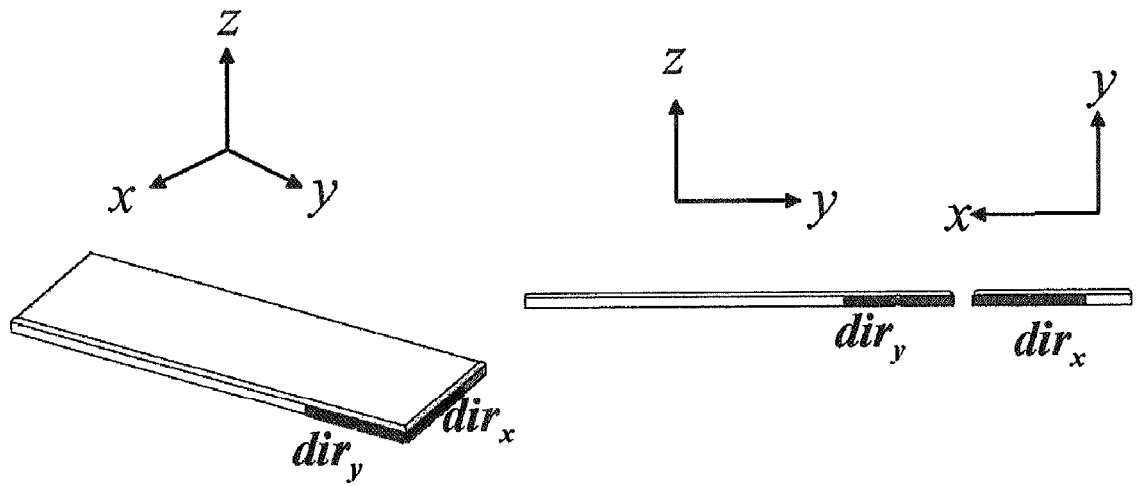
Figure 10:
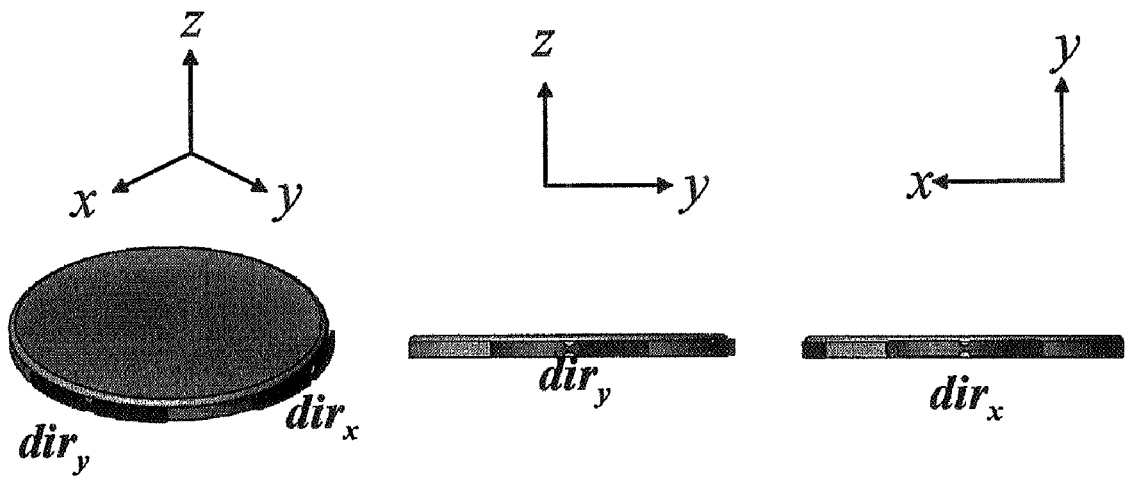

FIG. 3 illustrates a radiation characteristic of a tag in accordance with the present invention, FIG. 4 illustrates directions ($dir_x$, $dir_y$, $dir_z$) that can be recognized when tag coordinates x of FIG. 3 are disposed in parallel with a coordinate axis of an object, FIG. 5 illustrates a 3D RFID tag composed of three mutually orthogonal tags and a supporter, FIG. 6 illustrates a 3D RFID tag composed of three mutually orthogonal tags attached to the outside of an electric field shielding supporter for shielding off an electromagnetic field, and FIGS. 7 to 10 illustrate general bar-shaped tags having orientations and attached to objects to represent coordinates of the objects, according to shapes of the objects, without using a 3D RFID tag.

An object having the 3D RFID tag of FIG. 5 has a function of shielding off electromagnetic fields so that the 3D RFID tag is not recognized on a side opposite to a side where the tag is attached. And, the tag is attached to each of front and rear sides of the object to allow position and orientation of the object to be recognized.

In addition, the object bearing the tag of FIG. 6 does not have the function of shielding off electromagnetic fields, so that one 3D RFID tag is attached to a portion of the object to allow the position and orientation of the object to be recognized regardless of the front and back sides of the object.

As shown in FIGS. 3 to 10, the passive type RF tag attached along a constant direction of a targeted object enables simultaneous sensing and identification of the targeted object and the relationship between the physical orientation and the current antenna of the targeted object. When such characteristics are used to set coordinates capable of representing the targeted object and install the tag along coordinate axes, physical orientation of the targeted object can be recognized.

That is, the 3D RFID tag of the present invention may be composed of tags having orientations and a supporter for supporting the tags, and may be attached to an object having a function of shielding off electromagnetic fields to enable recognition of the position and orientation of the object.

In addition, the 3D RFID tag of the present invention may be composed of tags having orientations and a supporter having a function of shielding off electromagnetic fields, and may be attached to an object that does not have a function of shielding the electric field to recognize the position and orientation of the object.

According to the present invention, a plurality of RF tags having orientations as shown in FIG. 4 can be attached to corners of the polyhedral supporter capable of shielding off electric and magnetic fields, as shown in FIG. 6, so that information on the object can be selectively recognized in 3 mutually orthogonal directions.

In addition, the 3D RFID tag of the present invention can be built to have tags oriented perpendicularly to the six faces of a hexahedron, as shown in FIG. 5, so that the orientation of the hexahedron can be estimated.

As described above, the RFID tag allows far more information to be stored and supplied than conventional recognition techniques, recognition speed is fast, and a plurality of pieces of information can be simultaneously recognized.

In addition, in the present invention, the RFID tags are attached to the surface of the supporter, so that it is significantly resistant to contamination and damage.

Next, exemplary embodiments of an environment condition recognition system using a tag of the present invention will be described in detail with reference to FIGS. 11 to 14.

Figure 11:
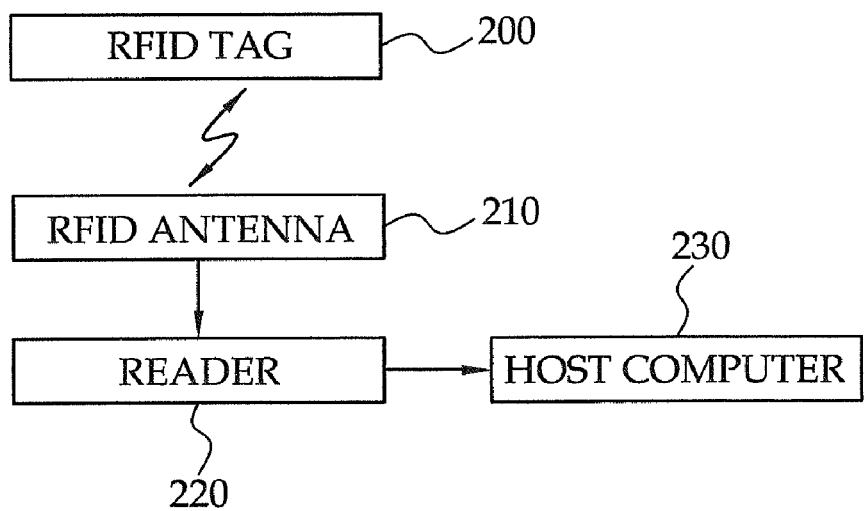
FIG. 11 is a block diagram illustrating an environment condition recognition system using a tag in accordance with the present invention.
Figure 12:
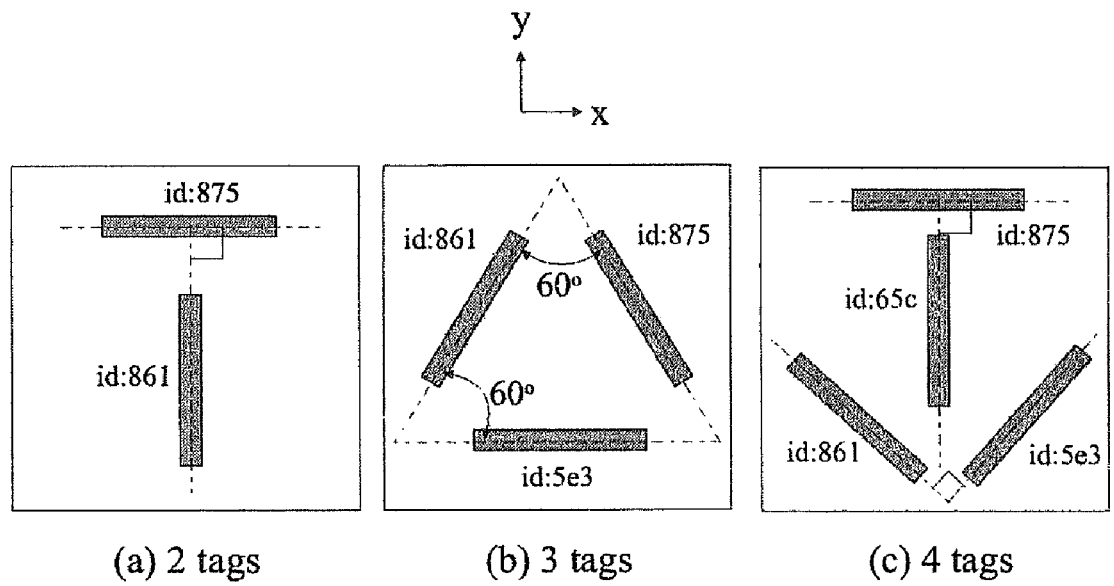
FIG. 12 illustrates combinations of tags applied to an environment condition recognition system in accordance with the present invention.
Figure 13:
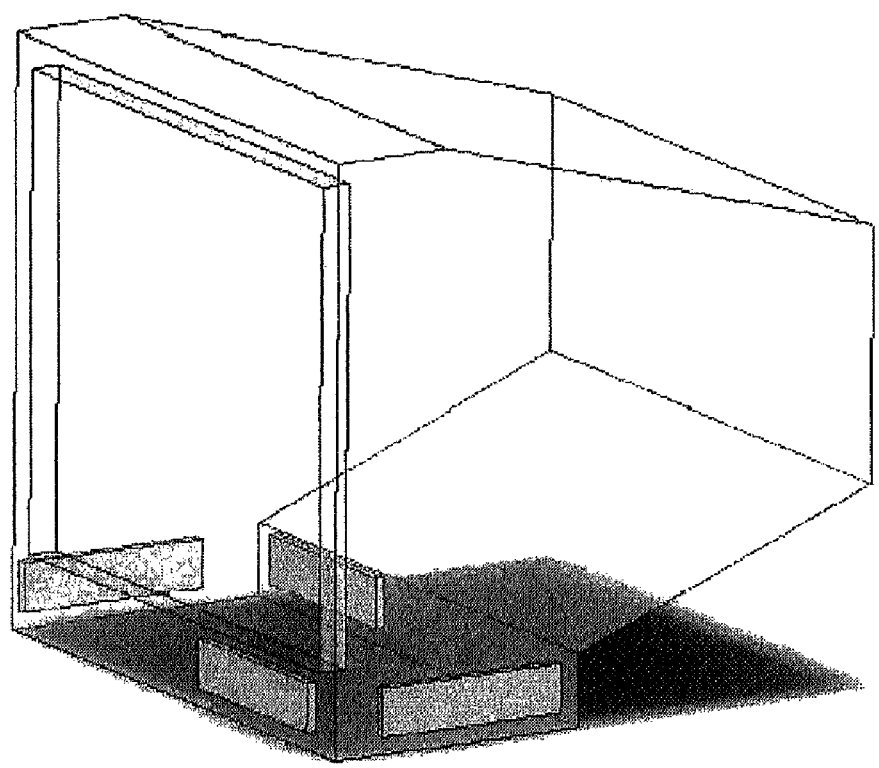
FIG. 13 illustrates tags disposed on a monitor for obtaining information about position and orientation of an object.
Figure 14:
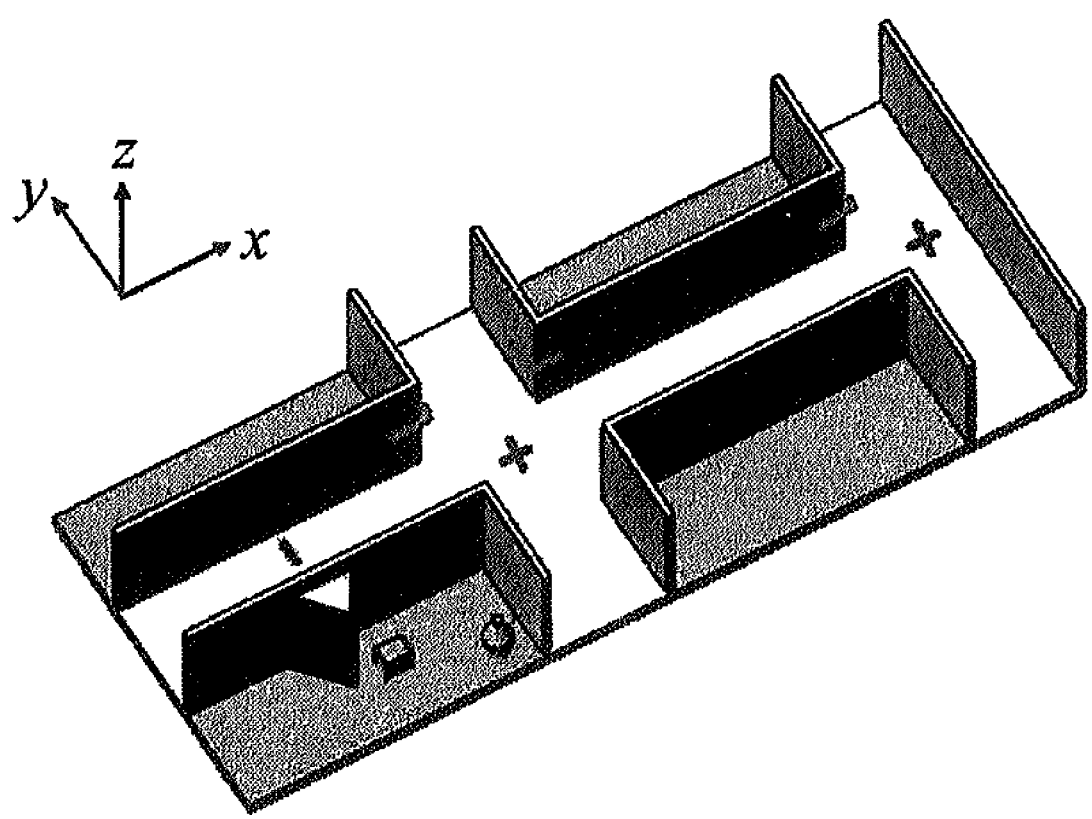
FIG. 14 illustrates tags disposed on a wall and a bottom of an aisle for obtaining topographic information of the environment.

FIG. 11 is a block diagram illustrating an environment condition recognition system using a tag in accordance with the present invention, FIG. 12 illustrates combinations of tags applied to an environment condition recognition system in accordance with the present invention, FIG. 13 illustrates tags disposed on a monitor for obtaining information about position and orientation of an object, and FIG. 14 illustrates tags disposed on a wall and a bottom of an aisle for obtaining topographic information of the environment.

Referring to FIG. 11, reference numeral 200 is an RFID tag composed of combinations of the individual RF tags of FIGS. 1, 5, and 6, or RF tags having several orientations. The RFID tag 200 also has a memory, a controller, and an antenna.

Reference numeral 210 is an RFID antenna activating the RFID tag 200 to initiate connection with the RFID tag 200, reference numeral 220 is a reader connected to the RFID antenna 210 and reading information of the RFID tag 200, and reference numeral 230 is a host computer connected to the reader 220 and collecting and analyzing information of the RFID tag 200.

Figure 15:
FIG. 15 illustrates an example in which a system shown in FIG. 11 is installed on a robot.
Figure 15:
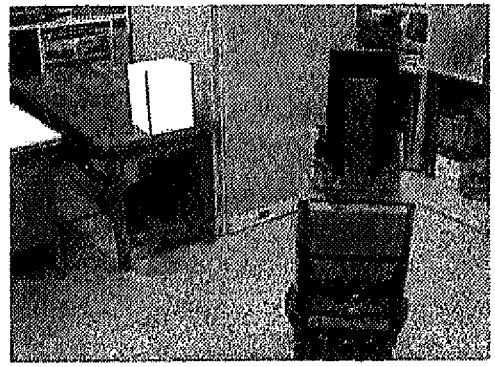
Figure 15:
Figure 15:
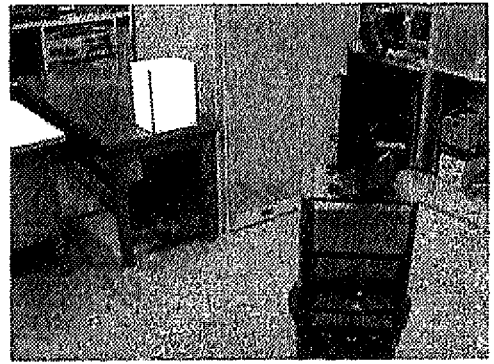
Figure 15:
Figure 15:
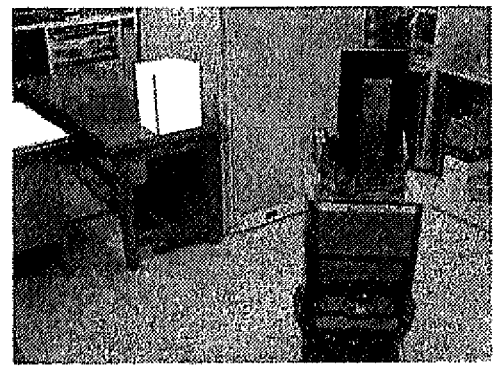
Figure 15:
Figure 15:

In addition, the RFID antenna 210, the reader 220, and the host computer 230 are built into a robot as shown in FIG. 15.

Next, a procedure of recognizing an object using the tag of the present invention will be described.

In the present invention, the above-described 3D RFID tag is used or the plurality of RF tags shown in FIG. 12 are combined to estimate the orientation of the object, and the identifiable angle of the tag is made to be not greater than an absolute value of 40 degrees.

That is, the tags are attached to the object so that the angle is 90 degrees between the tags in (a) of FIG. 12, 60 degrees between the tags in (b) of FIG. 12, and 45 degrees between the tags in (c) of FIG. 12.

FIG. 13 illustrates an example in which tags are disposed for recognizing a monitor by means of the arrangement shown in FIG. 12. That is, the monitor of a computer is neither disposed laterally nor upside down, and is positioned at a place having a predetermined height, so that four tags may be attached thereto as shown in FIG. 13 to recognize the monitor and estimate its orientation.

In addition, as shown in FIG. 14, tags may be disposed on a wall and a bottom of an aisle to recognize its environment. That is, four tags may be mounted on a central portion of the aisle in a cross-shaped way to recognize the divided aisle, tags may be attached to the wall of the aisle orthogonally as shown in FIG. 6 to recognize the wall of the divided aisle, and one tag may be disposed at a specific position to recognize the floor or a door.

Next, a procedure of recognizing position and orientation of the object using the tags disposed as described above will be described with reference to FIGS. 15 and 16.

Figure 16:
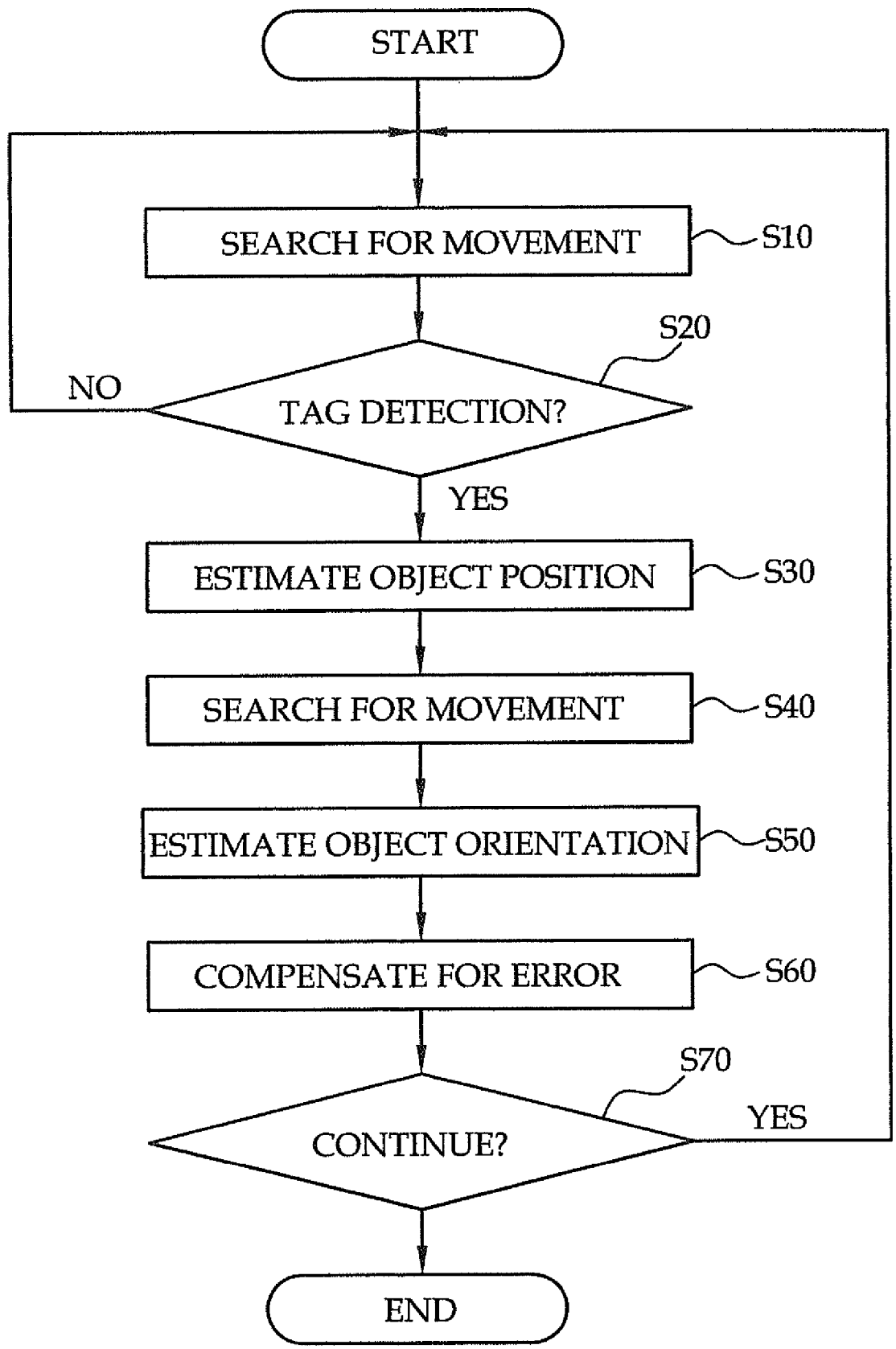
FIG. 16 is a flowchart illustrating a procedure carried out by the robot shown in FIG. 15.

FIG. 15 illustrates an example in which the system shown in FIG. 11 is installed on a robot, and FIG. 16 is a flowchart illustrating a procedure carried out by the robot shown in FIG. 15.

The robot is set to have, for example, positional information (500, 500, 0) as initial global coordinates, and it is assumed that a box used as an example of the object is positioned at the global coordinates (1200, 1000, 0). Several tags are attached to the box along axial directions of the orthogonal coordinate system as shown in FIG. 6.

When the robot is turned on, it activates the tags attached to the box by means of the RFID antenna 210 mounted within the robot while moving. That is, the robot initiates searching of the tags while moving to recognize the position of the box disposed within a constant radius.

Step S10 is repeated until the reader 220 mounted within the robot detects the box attached with the several tags (S20).

When the reader 220 mounted within the robot detects the tags, the host computer 230 mounted within the robot first estimates the position of the box. (S30). The robot then calculates the distance between the estimated position of the box and the robot itself, and continues searching while moving again to more accurately recognize the orientation of the box (S40).

The host computer 230 mounted within the robot then collects and analyzes information about the position and orientation of the box from the several tags attached to the box and estimates the orientation of the box (S50).

The host computer 230 mounted within the robot compensates the search error with respect to the position and orientation of the box in response to the information of the box collected in step S50 and conditions already set in the host computer (S60).

The robot then carries out the error compensation to update map data already set in the host computer 230 mounted within the robot, and determines whether the search operation must be continued (S70).

When the search operation continues in step S70, the procedure returns to step S10, otherwise, an operation for recognizing the position and orientation of the object is terminated.

As described above, the present invention mounts an RFID tag on an object to be measured to significantly facilitate sensing characteristics of the object by a technique of recognizing the object. The present invention provides a technique of automatically sensing, recognizing, and recognizing the object, using a 3D RFID tag having multi-directivity based on orientation when the RFID antenna 210 of the RFID reader 220 identifies several tags. Thus, orientation as well as intrinsic characteristics and position of the object can be recognized.

In addition, the present invention can be utilized for accurate environment recognition in a field where the environment recognition plays an important role, such as the field of intelligent robots. By way of example, in the most representative conventional technique of recognizing an object using a camera, a procedure of recording environment images using the camera for searching for an object of interest and matching the recorded image with templates stored in a memory is repeatedly carried out. When the template of the object is different from the object orientation of the image, many operations are required and the procedure is inefficiently repeated. However, according to the present invention as shown in FIGS. 15 and 16, the sensing, identification, and the orientation estimation can be simultaneously carried out to overcome the inefficiency of the conventional art.

In addition, the present invention can obtain orientation information of the object with respect to the antenna along with identification of the RFID tag, so that it can be widely applied to a field of environment transport using object or environment information, or a field of controlling the object, that is, an intelligent transport system ITS field, and so forth. In addition, the present invention may be applied for providing the visually impaired with more detailed information about objects. In addition, the present invention may be utilized for protecting products in physical distribution and circulation.

As described above, according to a 3D RFID tag and an environment condition recognition system using the tag of the present invention, an integrated autonomous identification technique can be implemented, which more easily obtains information about object, human, environment, and changes in physical characteristics (e.g., position, orientation) of a targeted object as well as information required for the identification, is stable from contamination and damage, and operates in a semi-permanent way.

In addition, according to the 3D RFID tag and the environment condition recognition system using the tag of the present invention, sensing, identification, and estimation of a targeted object can be simultaneously carried out, so that changes in physical characteristics (e.g., position, orientation) of the targeted object can be processed at a fast speed.

While this invention has been described in detail with reference to exemplary embodiments thereof, it will be apparent to those of ordinary skill in the art that various changes in form and detail may be made without departing from the scope and spirit of the invention as set forth in the appended claims.

What is claimed is:

1. An environment condition recognition system capable of recognizing a position and an orientation of an object, comprising:
    a three-dimensional (3D) radio frequency identification (RFID) tag including a plurality of radio frequency (RF) tags independently disposed along main axial directions representing an object, each of the RF tags having a self identifier (ID), and a supporter supporting the tags, the 3D RFID tag being attached to an object having an electromagnetic field shielding function;
    an RFID antenna activating the 3D RFID tag and initiating connection with the RF tags;
    a reader connected to the antenna and reading information of the RF tags; and
    an analysis unit connected to the reader and collecting and analyzing the information of the RF tags.

2. An environment condition recognition system capable of recognizing a position and an orientation of an object, comprising:
    a three-dimensional (3D) radio frequency identification (RFID) tag including a plurality of radio frequency (RF) tags independently disposed along main axial directions representing an object, each of the RF tags having a self identifier (ID), and a supporter supporting the tags and having an electromagnetic field shielding function, the 3D RFID tag being attached to an object not having an electromagnetic field shielding function;
    an RFID antenna activating the 3D RFID tag and initiating connection with the tag;
    a reader connected to the antenna and reading information of the RF tags; and
    an analysis unit connected to the reader and collecting and analyzing the information of the RF tags.

3. The environment condition recognition system according to claim 2, further comprising:
    a movement unit moving in order to recognize the position and the orientation of the object,
    wherein the RFID antenna, the reader, and the analysis unit are built into the movement unit.

4. The environment condition recognition system according to claim 3, wherein each of the RF tags is an active type RF tag or a passive type RF tag.

5. The environment condition recognition system according to claim 4, wherein each of the RF tags has same form and characteristics.

6. The environment condition recognition system according to claim 5, wherein the each of the RF tags is in a same shape, and has same electromagnetic characteristics and frequency band characteristics.

7. An environment condition recognition system capable of recognizing a position and an orientation of an object, comprising:
    a plurality of radio frequency (RF) tags having self identifiers (IDs), being independently disposed, and having orientation with respect to main axial directions;
    an RFID antenna activating the 3D RFID tag and initiating connection with the tag;
    a reader connected to the antenna and reading information of the tag; and
    an analysis unit connected to the reader and collecting and analyzing the information of the RF tags,
    wherein the plurality of RF tags correspond to the position and the orientation of the object, and are attached to the object so as to match the respective axial directions in an orthogonal coordinate system of the object.

8. The environment condition recognition system according to claim 7, further comprising:
    a movement unit moving in order to recognize the position and the orientation of the object,
    wherein the RFID antenna, the reader, and the analysis unit are built into the movement unit.

9. The environment condition recognition system according to claim 8, wherein each of the RF tags is an active type RF tag or a passive type RF tag.

10. The environment condition recognition system according to claim 9, wherein each of the RF tags has same form and characteristics.

11. The environment condition recognition system according to claim 10, wherein the each of the RF tags is in a same shape, and has same electromagnetic characteristics and frequency band characteristics.

12. A method of recognizing an environment condition capable of recognizing a position and an orientation of an object, the method comprising:
    attaching a plurality of radio frequency (RF) tags to the object, each of the RF tags having a self identifier (ID), being independently disposed, and having orientation with respect to a main axial direction;
    detecting the RF tags attached to the object by means of a radio frequency identification (RFID) antenna activating the RF tags and initiating connection with the RF tags, and a reader connected to the antenna and reading information of the RF tags; and
    collecting and analyzing the information of the RF tags by means of an analysis unit connected to the reader,
    wherein the plurality of RF tags correspond to the position and the orientation of the object, and are attached to the object so as to match the respective axial directions in an orthogonal coordinate system of the object.

13. The method according to claim 12, further comprising:
    moving a movement unit for recognizing the position and the orientation of the object,
    wherein the RFID antenna, the reader, and the analysis unit are built into the movement unit.

* * * * *